United States Patent [19]
Uno et al.

[11] Patent Number: 5,197,846
[45] Date of Patent: Mar. 30, 1993

[54] SIX-DEGREE-OF-FREEDOM ARTICULATED ROBOT MECHANISM AND ASSEMBLING AND WORKING APPARATUS USING SAME

[75] Inventors: Masahito Uno, Kanagawa; Koichi Sugimoto, Hiratsuka; Ichiro Taniguchi, Yokohama; Katuhisa Tanaka, Ayase, all of Japan

[73] Assignee: Hitachi, Ltd., Tokyo, Japan

[21] Appl. No.: 630,189

[22] Filed: Dec. 19, 1990

[30] Foreign Application Priority Data

Dec. 22, 1989 [JP] Japan ................................. 1-331371
Mar. 2, 1990 [JP] Japan ................................. 2-049331
May 11, 1990 [JP] Japan ................................. 2-119801

[51] Int. Cl.⁵ ............................................. B25J 9/16
[52] U.S. Cl. ..................................... 414/731; 414/735; 414/744.4; 414/917; 901/8; 901/15
[58] Field of Search ..................... 901/6, 8, 14, 15, 18, 901/23, 29, 41; 414/729, 730, 731, 732, 735, 739, 744.2, 744.4, 744.3, 744.5, 917; 269/55, 289 R

[56] References Cited

U.S. PATENT DOCUMENTS

| 4,260,941 | 4/1981 | Engelberger | 901/9 X |
| 4,636,135 | 1/1987 | Bancon | 414/730 |
| 4,693,664 | 9/1987 | Schweiker | 414/735 |
| 4,766,775 | 8/1988 | Hodge | 901/15 X |
| 4,784,422 | 11/1988 | Jones et al. | 414/735 X |
| 4,785,528 | 11/1988 | Soderberg | 414/729 X |
| 4,831,547 | 5/1989 | Ishiguro et al. | 901/6 X |
| 4,842,475 | 6/1989 | Driels | 901/8 X |
| 4,897,014 | 1/1990 | Tietze | 414/729 |
| 4,903,539 | 2/1990 | Toyoda et al. | 901/23 X |
| 4,907,467 | 3/1990 | Toyoda et al. | 901/23 X |

FOREIGN PATENT DOCUMENTS

| 9104522 | 4/1991 | European Pat. Off. | 901/8 |
| 0045563 | 3/1980 | Japan | 901/41 |
| 0109472 | 6/1984 | Japan | 901/6 |
| 1-45273 | 6/1990 | Japan | 901/8 |
| 2096362 | 10/1982 | United Kingdom | 414/730 |

Primary Examiner—Frank E. Werner
Assistant Examiner—James Eller
Attorney, Agent, or Firm—Fay, Sharpe, Beall, Fagan, Minnich & McKee

[57] ABSTRACT

A six-degree-of-freedom articulated robot mechanism includes a three-degree-of-freedom translation unit for adjusting the position. The translation unit includes an orientation maintaining mechanism which has a rotation articulation of the direct drive type connecting a drive motor directly to an arm, and a link mechanism. A three-degree-of-freedom rotation unit for adjusting the orientation includes three rotation articulators of the direct drive type connecting a drive motor directly to a table, and the axes of the three rotation articulators intersect one another at one point.

8 Claims, 14 Drawing Sheets

SIX-DEGREE-OF-FREEDOM ARTICULATED ROBOT MECHANISM AND ASSEMBLING AND WORKING APPARATUS USING SAME

BACKGROUND OF THE INVENTION

This invention relates to an articulated robot mechanism used for assembling and working (machining) operations, and more particularly to a six-degree-of-freedom articulated robot mechanism capable of effecting highly-precise positioning and orienting and also of effecting highly-precise assembling and working operations. The invention also relates to an assembling and working apparatus employing such a robot mechanism.

Generally, there are three degrees of freedom of the position of an object, and there are three degrees of freedom of its orientation. Therefore, a robot capable of providing any desired position and orientation is required to have six degrees of freedom. There are four methods of providing three degrees of freedom of the position. These four methods are, respectively, a Cartesian coordinates-type depending on three translational motions, a cylindrical coordinates-type depending on two translational motions and one rotation, a polar coordinates-type depending on one translational motion and two rotations, and an articulation-type depending on three rotations. With respect to a method of providing three degrees of freedom of the orientation, the three motions must all depend on rotations.

Under the circumstances, there has been proposed a six-degree-of-freedom robot of the type, as disclosed in Japanese Patent Unexamined Publication No. 60-52276, which comprises a four-degree-of-freedom unit having three degrees of freedom of the position in polar coordinates and one degree of freedom of the orientation, and a two-degree-of-freedom unit having two degrees of freedom of the orientation.

In the above prior art, five out of six degrees of freedom are effected by rotation articulation mechanisms each in the form of a rotation transmission mechanism comprising a servo motor and a reduction gear unit, or a servo motor, a belt and pulleys. The remaining one degree of freedom is effected by a translation transmission mechanism comprising a servo motor and a feed screw. Thus, in any of these mechanisms, the drive motor is not directly connected to an arm or a table, and therefore there has been encountered a problem that due to play and lost motion occurring in the reduction gear portion contained in the rotation transmission mechanism or the translation transmission mechanism, the positioning precision of the robot is lowered.

As described above, the above prior art has not paid attention to the compatibility between the flexibility and high-precision positioning of the robot, and therefore has a problem with respect to a high-function and high-performance design of the robot.

Referring to the conventional operation apparatus of the automatic tool exchanging type for automatically exchanging a plurality of tools so as to effect various operations such as assembling and adjusting operations, Japanese Patent Unexamined Publication No. 63-39780 discloses an automatic tool exchange apparatus employing a robot hand, and Japanese Patent Unexamined Publication No. 62-9887 discloses an automatic hand exchange apparatus, and Japanese Patent Unexamined Publication No. 61-117087 discloses an attachment-/detachment apparatus. In such apparatuses, the tools are exchanged depending on the purpose of the operation, and various operations such as assembling and adjusting operations can be carried out.

In the conventional tool exchange apparatuses, a drive actuator must be mounted on each hand or each tool (end effector), so that the end effector has an increased size, and the costs of the exchange end effectors and the exchange tools have been increased. In addition, the burden on the exchange apparatus has been increased. Further, since each end effector has an increased size, a large space for accommodating the end effectors has been needed.

Further, since the actuator is mounted on the end effector, signal wires and a power cable for the actuator can not be easily treated, and also in the case where the signal wires and power cable for the actuator are connected through contact terminals, the available terminals are mostly occupied by these contact terminals, so that the number of those terminals other than the contact terminals is reduced, and also the contact terminal portion has been increased in size.

Further, no consideration has been given to the change of the freedom degree by the addition of an effector (for example, a robot arm) other than those for the hands and the tools. Thus, this problem has not been dealt with.

SUMMARY OF THE INVENTION

It is a first object of this invention to provide a six-degree-of-freedom articulated robot mechanism enabling an automation of a flexible production.

A second object of the invention is to provide a six-degree-of-freedom articulated robot mechanism which enables automation of a flexible production, and improves the position and orientation precisions.

A third object of the invention is to provide an operation tool automatic exchange apparatus for exchanging operation hands or operation tools adapted to be attached to a distal end of a robot arm, which apparatus can enable easy exchange of the operation hands or the tools depending on the kind of the operation, is small and lightweight, and is inexpensive.

In order to achieve the first object, the present invention provides a six-degree-of-freedom articulated robot mechanism comprising a three-degree-of-freedom translation unit and a three-degree-of-freedom rotation unit which are releaseably combined together; that is, the units can be operably linked, but can be released from linkage with each other without requiring the use of additional tools.

In order to achieve the second object, the present invention provides a six-degree-of-freedom articulated robot mechanism comprising a position-adjusting three-degree-of-freedom translation unit including an orientation maintaining mechanism which includes a rotation articulation of the direct drive type connecting a drive motor directly to an arm and a link means; and an orientation-adjusting three-degree-of-freedom translation unit including three rotation articulations of the direct drive type connecting a drive motor directly to a table, the axes of rotation of the three rotation articulations intersecting one another at one point, the translation unit and the rotation unit being releaseably combined together.

In order to achieve the third object, the present invention provides an operation tool automatic exchange apparatus which comprises a hold-side member, an exchange member which is releaseably held by the hold-side member and is adapted to hold an operation tool, coupling means for releaseably coupling the hold-side member and the exchange member together, and power transmission means for transmitting the rotation of a drive rotation shaft, mounted on the hold-side member, to a driven rotation shaft mounted on the exchange member, when the hold-side member and the exchange member are coupled together.

A modified operation tool automatic exchange apparatus comprises a hold-side member, an exchange member which is releaseably held by the hold-side member and is adapted to hold an operation tool, coupling means for releaseably coupling the hold-side member and the exchange member together, and connecting means for connecting the exchange member to a rotation shaft mounted on the hold-side member, whereby the exchange member is rotated by the rotation shaft.

In the above operation tool automatic exchange apparatus, at least one of means for rotating the rotation shaft and means for detecting the rotation, angle of the rotation shaft is provided on the hold-side member.

Another modified operation tool automatic exchange apparatus comprises a hold-side member, an exchange member which is releaseably held by the hold-side member and is adapted to hold an operation tool, coupling means for releaseably coupling the hold-side member and the exchange member together, and power transmission means for transmitting the motion of a linearly-movable member, mounted on the hold-side member, to the exchange member, when the hold-side member and the exchange member are coupled together.

In the above operation tool automatic exchange apparatus, a rotation base rotatable by a drive rotation shaft mounted on the exchange member is mounted on the exchange member.

In the above operation tool automatic exchange apparatuses, there is provided a connecting mechanism for connecting at least one of electric wiring and pressure piping between the exchange member and the hold-side member.

In an operation method of the present invention using the operation tool automatic exchange apparatus provided with the above rotation base, the direction of the axis of rotation of the rotation base is selected depending on the operation tool to be used for an intended operation, and the exchange members are exchanged depending on this.

The present invention also provides a robot employing a gravity balancing apparatus by which the gravity balancing of the arm is achieved, thereby reducing the load acting on an actuator for driving the arm.

Next, the operations of the present invention for achieving the above objects will now be described. As described above, the six-degree-of-freedom articulated robot mechanism of the present invention comprises a position-adjusting three-degree-of-freedom translation unit including an orientation maintaining mechanism which includes a rotation articulation of the direct drive type connecting a drive motor directly to an arm and a link means; and an orientation-adjusting three-degree-of-freedom rotation unit including three rotation articulations of the direct drive type connecting a drive motor directly to a table, the axes of rotation of the three rotation articulations intersecting one another at one point, and the translation unit and the rotation unit being releaseably combined together. With this construction, any desired position and orientation of the object can be obtained, and a flexible motion can be obtained. Further, since the drive motor is connected directly to the arm or the table, neither play nor lost motion will occur between the drive motor and the arm or the table, thereby enabling a high-precision positioning.

Since the rotation articulation is provided with the gravity balancing means, the moment load due to the weight of the arm or the table is received by the gravity balancing means, so that the arm or the table can be maintained at its stop position, or the orientation thereof can be maintained.

Since the gravity balancing means can be composed of any one of a brake, a spring and a hydraulic cylinder mechanism, the moment load due to the weight of the arm or the table is reduced, so that the load on the drive motor can be reduced.

In the above-mentioned operation tool automatic exchange apparatuses, a suitable one of the end effectors is selected depending on the kind of operation to be done, and the robot arm is moved so as to couple the hold-side member and the exchange member (which holds the end effector) of the operation tool automatic exchange apparatus. At the same time, the drive rotation shaft o the hold-side member is connected to the driven rotation shaft on the exchange member. Then, the robot arm is moved to bring the end effector to an operation object so as to carry out various operations such as assembling and adjusting operations. In this case, if necessary, using the rotation shaft of the operation tool automatic exchange apparatus, the power, a displacement or the speed is transmitted to the end effector (i.e., the hand or the tool) attached to the exchange member during the operation. By doing so, the optimum operation can be made depending on the conditions of such operation. And besides, the overall size of the apparatus can be made small, and the cost thereof can be reduced.

In the case where the rotation base is mounted on the exchange member, with the operation tool attached to the rotation base, the operation tool can be used in a more efficient manner by suitably selecting the angular position of the rotation base.

The operation of the gravity balancing apparatus of the present invention will now be explained.

As described above, the gravity balancing apparatus comprises a load-supporting shaft which is connected at one end thereof to a support portion of the arm spaced from a swing shaft in a load-applying direction, the arm being swingable about the axis of the swing shaft; a compression spring through which the load-supporting shaft is extended, the compression spring receiving the gravitational load of the arm; a first member mounted on the other end of the load-supporting shaft so as to transmit the load to one end of the compression spring; and a second member which supports the other end of the compression spring and is swingably mounted on a support structure on which the swing shaft is also supported. The distance between the support portion of the arm and the axis of rotation of the arm, the position of the second member relative to the axis of rotation of the arm, and the spring constant of the compression spring are so determined that a gravitational torque applied to the axis of rotation of the arm can be canceled to zero or generally zero. These constants determined for canceling the gravitational torque to generally zero are made using the following formula:

$$T = \left(1 + \frac{x_o}{x}\right) \cdot l \cdot r \cdot \cos(\alpha + \theta)$$

with the provisos that $$x = \sqrt{(l^2 + r^2 + 2lr\sin(\alpha + \theta))}$$

l represents the distance between the swing shaft and the load-supporting shaft connected to the compression spring, $$r = \sqrt{(px^2 + py^2)},$$

px-py represents the position of the member, swingably supporting one end of the compression spring, relative to the axis of the arm which is the axis of the swing shaft, and T represents the torque for balancing the arm. By determining the above constants or parameters by the above formula, the apparatus for obtaining the gravitational load of the arm is designed In this apparatus, when the gravitational load of the arm is applied, the force due to the load exerted on the arm is transmitted to the spring via the shaft connected to the arm, and this force tends to deform the spring. This force is supported by the resiliency of the spring. The resilient force of the spring is proportional to the amount of displacement of the spring, and the angle between the above shaft and the arm is changed. As a result, the force for canceling the gravity varies in accordance with the swing angle of the arm; however, by suitably selecting the support position where the one end of the spring is swingably supported, the position of the swing shaft for the arm, the spring constant, and thus the force for canceling the gravity can be made to the optimum level.

By doing so, the torque caused by the compression spring is exerted in accordance with the gravitational torque produced about the swing shaft, so as to cancel it, thereby canceling the torque about the swing shaft to generally zero, so that the swing arm can be easily moved.

The above apparatus can be used on an arm of a robot on which a gravitational load is exerted, in which case the load on an actuator for driving the robot arm subjected to such gravitational load can be reduced.

The above compression spring may be replaced by a pneumatic spring, in which case similar effects can be achieved.

Where the above gravity balancing apparatus is provided with the damper disposed parallel to the compression spring, in addition to the above effects, there is obtained another effect of suppressing the vibration of the swing arm.

DETAILED DESCRIPTION OF THE PREFERRED EMBODIMENTS

Figure 1:
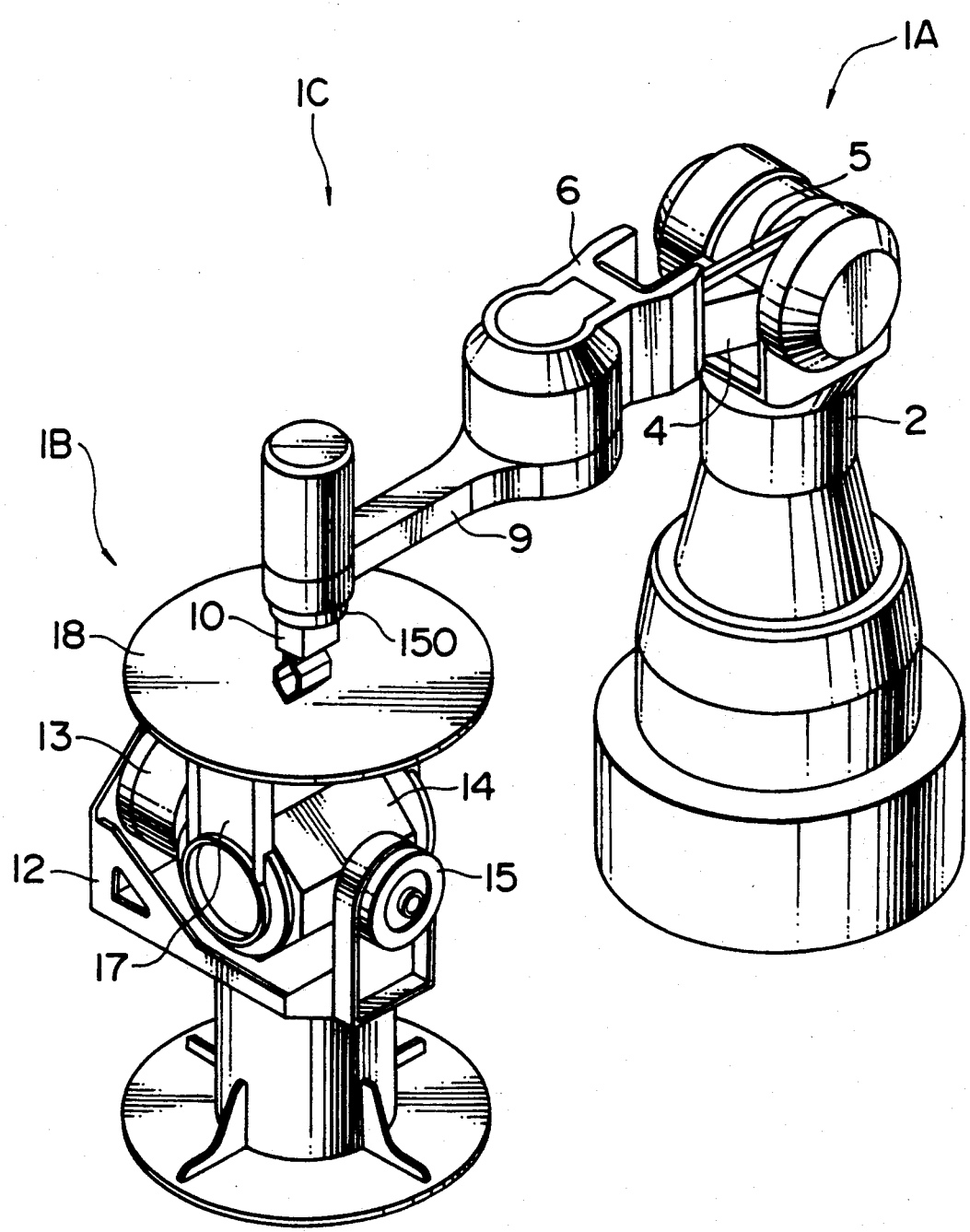
FIG. 1 is a perspective view of one embodiment of six-degree-of-freedom robot mechanism of the present invention.
Figure 2:
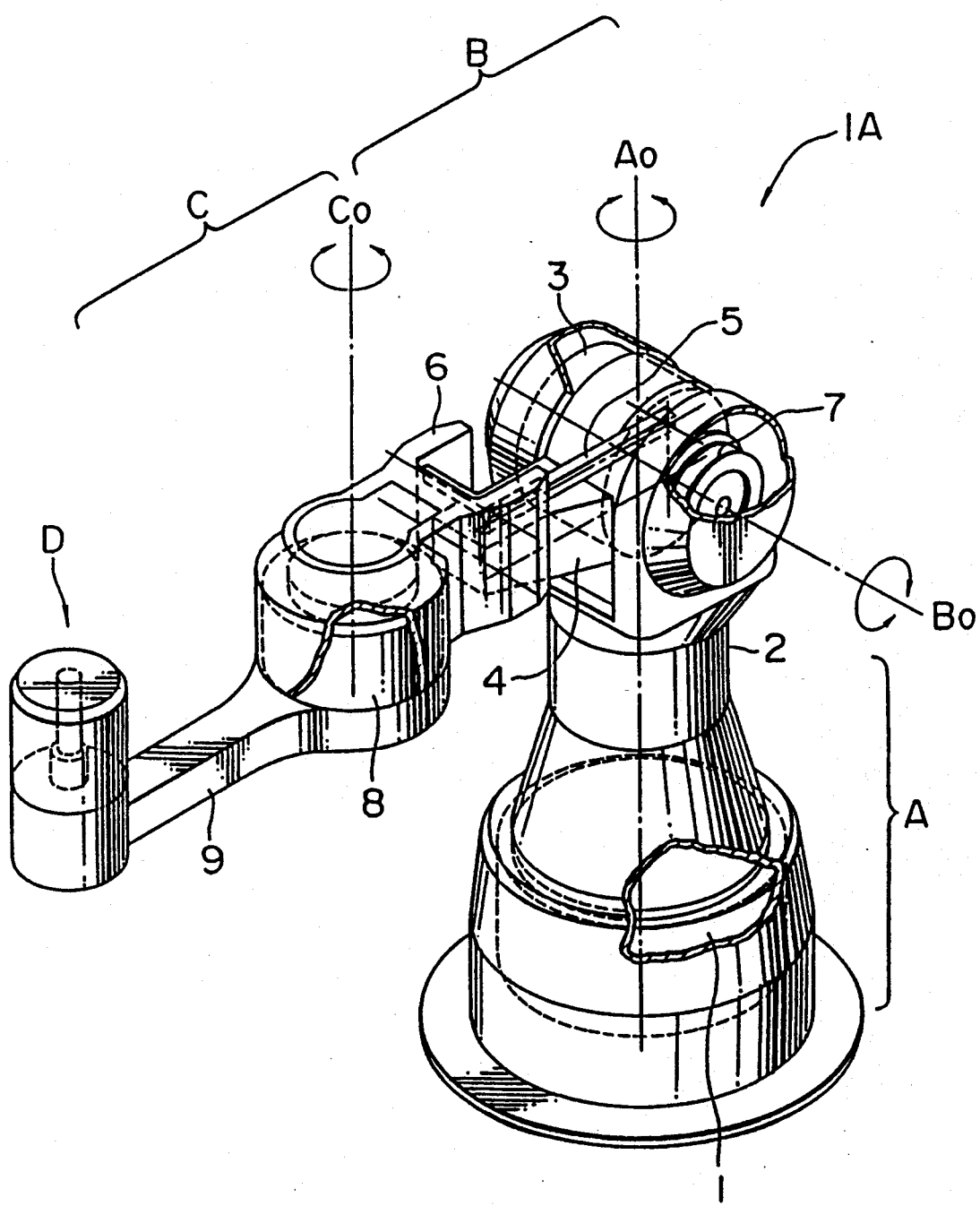
FIG. 2 is a perspective view of a three-degree-of-freedom translation unit of the robot mechanism of FIG. 1.
Figure 3:
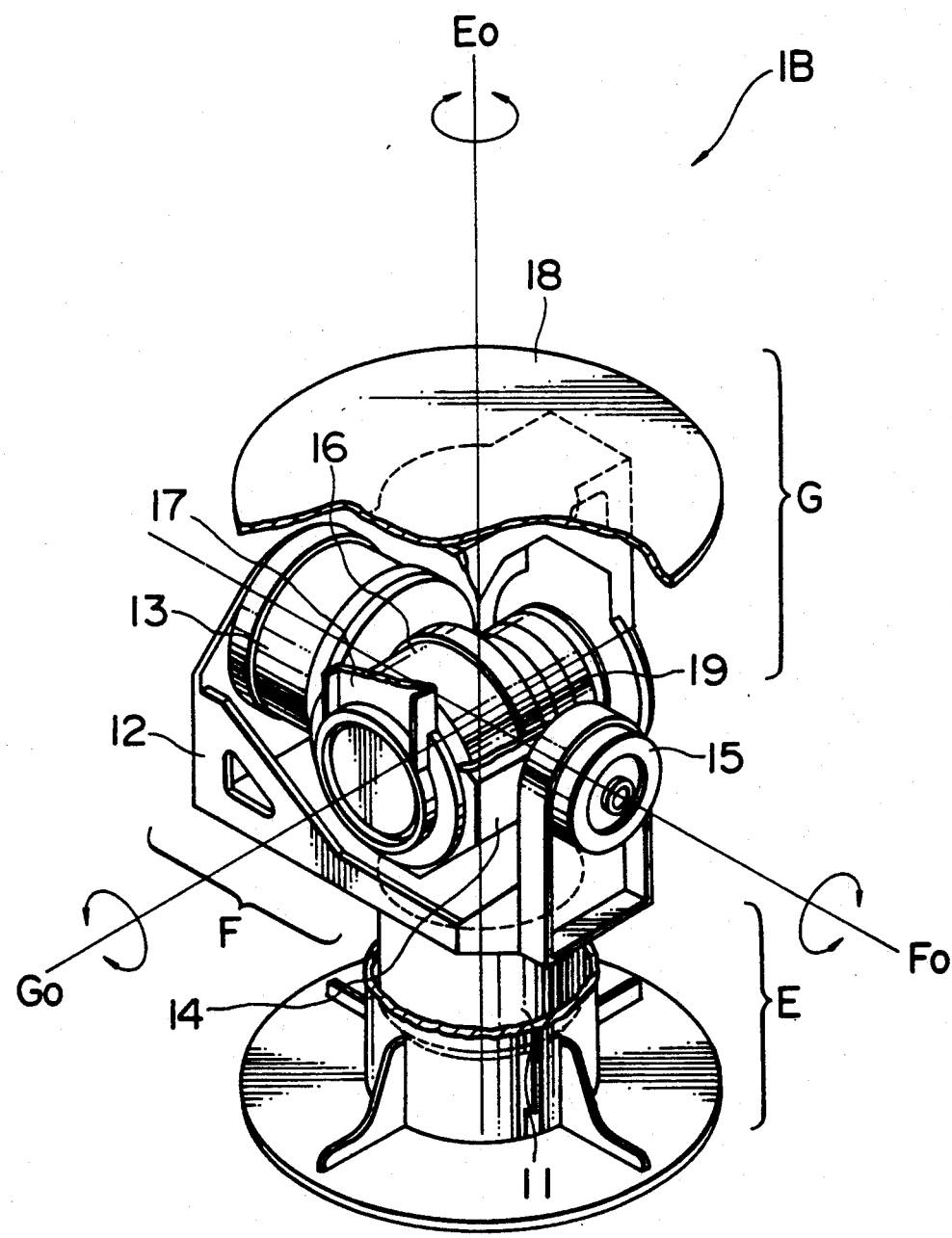
FIG. 3 is a perspective view of a three-degree-of-freedom rotation unit of the robot mechanism of FIG. 1.

One preferred embodiment of a six-degree-of-freedom robot mechanism of the present invention will now be described with reference to FIGS. 1 to 3. degree-of-freedom robot mechanism of this embodiment, and FIG. 2 is a perspective view of a three-degree-of-freedom translation unit of the robot mechanism of FIG. 1 for adjusting the position, and FIG. 3 is a perspective view of a three-degree-of-freedom rotation unit of the robot mechanism of FIG. 1 for adjusting the orientation.

As shown in FIG. 2, the three-degree-of-freedom translation unit 1A for adjusting the position comprises right-left turning part A, up-down turning part B, arm part C, and wrist part D. An output shaft of a direct drive motor 1 mounted within the right-left turning part A is connected directly to a right-left turning post 2, and the right-left turning parts A are angularly movable about a central axis Ao. When a direct drive motor 3 of the up-down turning part B is driven, the rotation of its output shaft causes the arm part C to move up and down through a pair of parallel links 4 and 5 engaged at their one ends with an up-down member 6 of the arm part C. There is provided a solenoid brake 7 constituting gravity balancing means for the direct drive motor 3 of the up-down turning part B. The arm part C includes a direct drive motor 8 having an output shaft fixedly fitted in the up-down member 6. This output shaft is connected directly to an arm 9, and the arm part C is angularly movable about a central axis Co. An end effector 10 of a shape shown in FIG. 1 is attached to the wrist part D. Namely, the positioning of the end effector 10 (which is attached to the distal end of the arm 9) in a horizontal plane can be effected by controlling the rotation angle of the direct drive motor 1 of the right-left turning part A and the rotation angle of the direct drive motor 8 of the arm part C, and also the positioning of the end effector 10 in a vertical plane can be effected by controlling the rotation angle of the direct drive motor 3 of the up-down turning part B. When the up-down turning part B is moved up and down, the ends of the pair of links 4 and 5 swing about a central axis Bo of the direct drive motor 3, and therefore the positions of the up-down member 6 and the end effector 10 with respect to the horizontal plane are changed. However, the up-down member 6 and the end effector 10 can be located at respective desired positions by controlling the rotation angle of the direct drive motor 1 of the right-left turning part A and the rotation angle of the direct drive motor 8 of the arm part C.

As shown in FIG. 3, the three-degree-of-freedom rotation unit 1B for adjusting the orientation comprises X-rotation part E, Y-rotation part F and Z-rotation part G. An output shaft of a direct drive motor 11 mounted within the X-rotation part E is connected directly to a Y-rotation base 12 of the Y-rotation part F, and is angularly movable about a central axis Eo. An output shaft of a direct drive motor 13 of the Y-rotation part F is directly connected to a Z-rotation base 14 of the Z-rotation part G, and is angularly movable about a central axis Fo. A solenoid brake 15, which constitutes gravity balancing means for the direct drive motor 13, is mounted on the Y-rotation base 12, the Z-rotation base 14 being interposed between the direct drive motor 13 and the solenoid brake 15. An output shaft of a direct drive motor 16 of the Z-rotation part G is connected directly to a table frame 17, and a table 18 is mounted on the table frame 17. A solenoid brake 19, which constitutes gravity balancing means for the direct drive motor 16, is mounted on the Z-rotation base 14. The output shaft of the direct drive motor 16 of the Z-rotation part G is angularly movable about a central axis Go. The central axes Eo, Fo and Go intersect perpendicularly to one another at one point. Therefore, the orientation of the table 18 in a space can be effected by controlling the rotation angle of the direct drive motor 11 of the X-rotation part E, the rotation angle of the direct drive motor 13 of the Y-rotation part F and the rotation angle of the direct drive motor 16 of the Z-rotation part G. Therefore, as shown in FIG. 1, the positioning of an object handled by the end effector 10 can be effected by the three-degree-of-freedom translation unit 1A, and the orienting of the object on the table 18 can be effected by the three-degree-of-freedom rotation unit 1B. Therefore, any desired position and orientation of the object can be obtained by the six-degree-of-freedom robot 1C composed of a combination of the above two units.

With respect to the gravitational loads of the arm part C and the wrist part D exerted on the direct drive motor 3 of the up-down turning part B of the three-degree-of-freedom translation unit 1A, the position can be maintained by operating the solenoid brake 7 when the motor 3 is stopped. With respect to the gravitational load of the Z-rotation part G exerted on the direct drive motor 13 of the Y-rotation part F of the three-degree-of-freedom rotation unit 1B, the solenoid brake 15 is operated. With respect to the gravitational load of the table frame 17, the table 18, etc., exerted on the direct drive motor 16 of the Z-rotation part G, the solenoid brake 19 is operated when the motor 16 is stopped, thereby maintaining the orientation of the table 18. In this embodiment, although the solenoid brake 7 is used as the gravity balancing means so as to provide a static balance, a dynamic balance may instead be provided by a spring or a pneumatic cylinder mechanism operated by a predetermined air pressure.

As described above, in the six-degree-of-freedom robot mechanism of the present invention, the positioning can be effected by the three-degree-of-freedom translation unit, and the orienting can be effected by the three-degree-of-freedom rotation unit. Therefore, by suitably combining necessary operations of the two units, a flexible production can be automated. Instead of the combination of the three-degree-of-freedom translation unit and the three-degree-of-freedom rotation unit, any one of conventional Cartesian coordinates-type unit, cylindrical coordinates-type unit and polar coordinates-type unit for providing three degrees of freedom of the position can be combined with the three-degree-of-freedom rotation unit for providing three degrees of freedom of the orientation, thereby providing a six-degree-of-freedom robot. Thus, the present invention has substantial general-purpose properties.

Further, in the robot mechanism, all the direct drive motors are connected directly to the arm or the table, and therefore the influence of play and lost motion in a reduction gear unit heretofore encountered with the prior art is eliminated, thus enabling the high-precision positioning and orienting.

Further, the gravitational load, exerted on the arm or the table when the associated direct drive motor is stopped, is balanced by the braking operation of the solenoid brake, thereby ensuring that the position and orientation are maintained, thus preventing the gravitational load from damaging the arm or the table.

Further, in the case where the above gravity balancing means comprises a spring or a power cylinder mechanism, the moment load due to the weight of the arm or the table can be decreased, thereby reducing the load on the drive motor.

Next, preferred embodiments of an operation tool automatic exchange apparatus of the present invention will be described.

Figure 4:
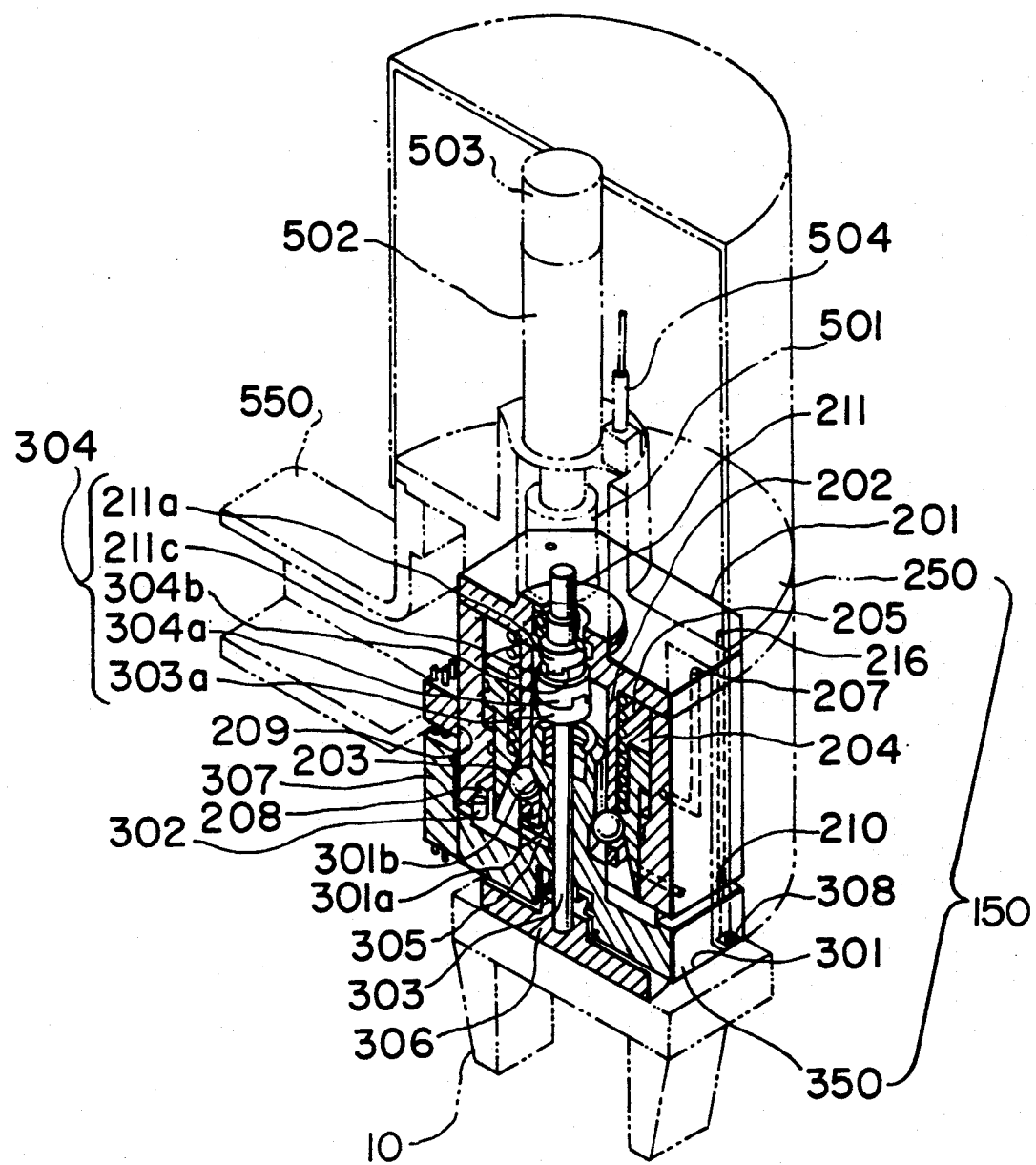
FIG. 4 is a cross-sectional, perspective view of a first embodiment of an operation tool automatic exchange apparatus of the present invention.

FIG. 4 is a cross-sectional, perspective view of a first embodiment of an operation tool automatic exchange apparatus of the invention.

The operation tool automatic exchange apparatus 150 of this embodiment comprises a hold-side member 250 and an exchange member 350.

Although only one exchange member 350 is shown, various kinds of such exchange members are prepared, and can be exchanged, that is, attached and detached, in a manner mentioned below.

A body of the operation tool automatic exchange apparatus 150 is attached to a distal end of a robot arm 550, and is moved in an operation space in a three-dimensional manner, thereby performing various operations such as assembling and adjusting operations.

A housing 201 which is a constituent part of the hold-side member 250 is attached to the distal end of the robot arm 550, and the housing 201 can be positioned in a three-dimensional direction by the robot arm 550. A ball bearing housing 202 is fitted in and fixed to the housing 201. The ball bearing housing 202 has a plurality of holes in which steel balls 203 are received, respectively. A taper piston 204 having a tapered opening operates the steel balls 203 when the taper piston 204 is moved. The tapered piston 204 is normally urged downward by a spring 205 to push the steel balls 203 toward the center line of the ball bearing housing 202. When pressurized air is supplied to a cylinder 211 via a pipe 207, the taper piston 204 is moved upward, so that the steel balls 203 are moved outward.

An exchange base 301, which is a constituent part of the exchange member 350, has a fitting part 301a which is adapted to be fitted in the ball bearing housing 202. The fitting part 301a has a tapered portion 301b which receives the steel balls 203 when the fitting part 301a is fitted in the ball bearing housing 202. The fitting part 301a of the exchange base 301 is fitted in the ball bearing housing 202, and the taper piston 204 is urged downward to urge the steel balls 203 inward, so that the steel balls 203 are engaged with the taper portion 301b of the fitting part 301a, thereby fixedly coupling the exchange base 301 and the housing 201 together. At this time, a rotation prevention pin 302 is engaged in a rotation prevention hole 208. Thus, the pin 302 and the hole 208 serve as positioning means for disposing the exchange base 301 and the housing 201 in the same direction each time they are coupled together.

An Oldham's coupling shaft 303, which is a rotation shaft of the driven side, extends through the exchange base 301 along the centerline thereof, and is rotatably supported on the exchange base 301 by ball bearings. An Oldham's coupling 304 is mounted on the upper end of the Oldham's coupling shaft 303. In the Oldham's coupling 304, an Oldham's coupling hub 211a, which is formed on a lower end of a housing shaft 211 (shaft of the drive side), can be releaseably engaged via an Oldham's coupling disk 304a with an Oldham's coupling hub 303a formed on the upper end of the Oldham's coupling shaft 303. The Oldham's coupling hub 211a has trapezoidal teeth 211c which are engageable in trapezoidal grooves 304b formed in the Oldham's coupling disk 304a. With this construction, a rotation can be transmitted between the housing shaft 211 and the Oldham's coupling shaft 303.

In the present invention, when the Oldham's coupling 304 is used as in this embodiment, the rotation angle can be accurately transmitted. Because of the use of the Oldham's coupling 304 with the trapezoidal teeth, a small variation in the butting distance between the Oldham's coupling shaft 303 and the housing shaft 211 and a slight misalignment therebetween, which result from dimensional inaccuracies of the exchange base 301 and the housing 201, can be suitably absorbed.

The Oldham's coupling shaft 303 is slightly pushed by a plunger 305 mounted on the exchange base 301, so that the Oldham's coupling shaft 303 is prevented from idling when the exchange base 301 is disconnected from the housing 201.

Mounted on the lower end of the Oldham's coupling shaft 303 is a rotation base 306 to which an end effector 10 is attached.

The housing shaft 211 (shaft of the drive side) is connected via a coupling 501 to a servo motor 502 mounted on the robot arm 550. An encoder 503 for detecting the rotation angle of the servo motor 502 is integrally mounted on the servo motor 502. A sensor 504 for detecting the origin of the rotational position of the servo motor 502 is mounted on the robot arm 550.

A female contact connector 209 is mounted on the housing 201, and is engageable with a male contact connector 307 mounted on the exchange base 301, thereby making electrical connection between the housing 201 and the exchange base 301. An air passageway 216 is formed through a part of the housing 201, and communicates via a rubber contact 210 with an air passageway 308 formed in the exchange base 301, thereby providing a pneumatic connection between the housing 201 and the exchange base 301.

Figure 5:
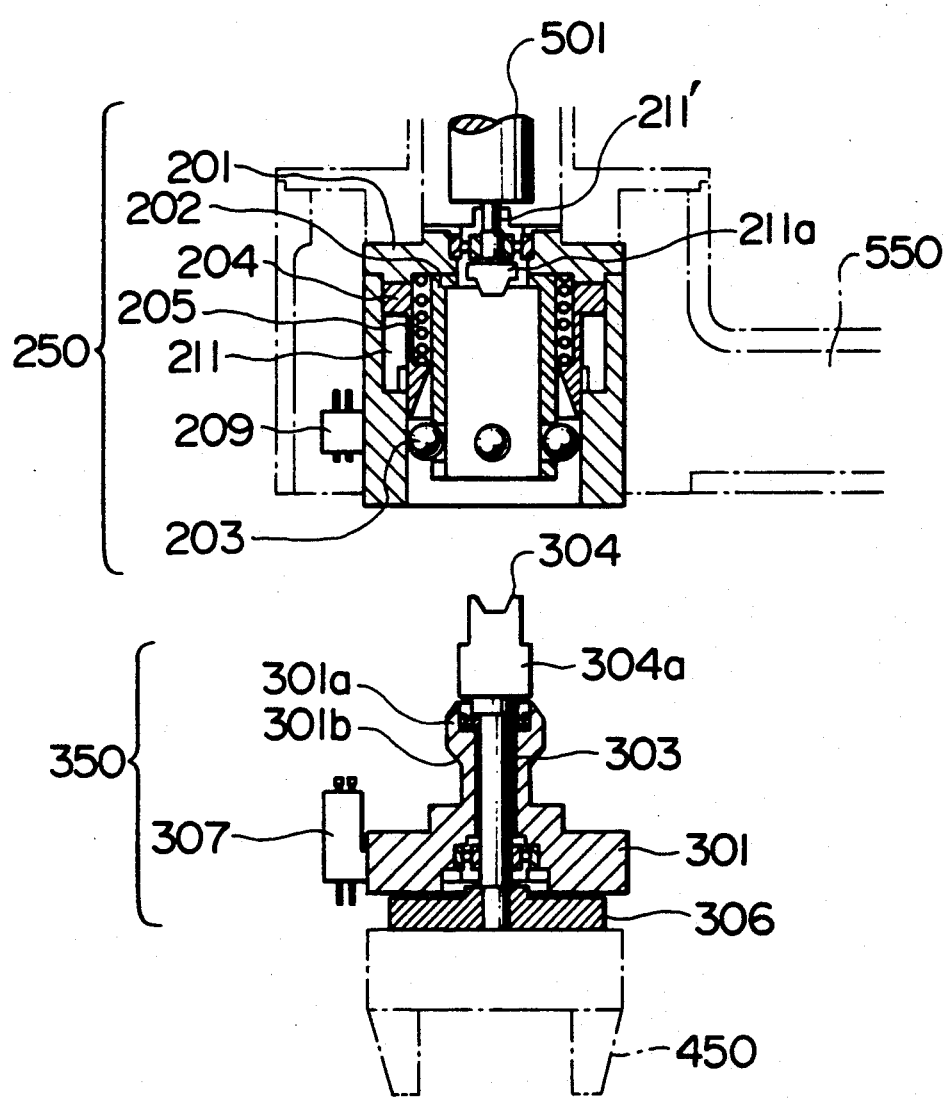
FIG. 5 is a cross-sectional view of a hold-side member and an exchange member of the apparatus of FIG. 4, shown in opposed relation to each other.

The operation of the operation tool automatic exchange apparatus 150 of the above construction will now be described. First, pressurized air is supplied through an air supply port to move the taper piston 204 upward, so that the steel balls 203 are held in their outward positions in the ball bearing housing 202. This condition is shown in FIG. 5. The robot arm 550 is moved to fit the housing 201 on the fitting part 301a of the exchange base 301. Then, the supply of the pressurized air is stopped to move the taper piston 204 downward, so that the steel balls 203 are urged into the tapered portion 301b of the fitting part 301a, thus completing the coupling between the housing 201 and the exchange base 301. At the same time, the Oldham's coupling hub 211a of the housing shaft 211 is engaged with the Oldham's coupling disk 304a of the exchange base 301. As a result, the rotation of the servo motor 502 can be transmitted to the Oldham's coupling shaft 303. Also, at the same time, the contact connectors 209 and 307 are contacted with each other, thereby electrically connecting the housing 201 and the exchange base 301.

In the above construction, the exchange base 301, which is a constituent part of the exchange member 350, is not provided with a motor, and therefore the mechanism is simple, and a lightweight design can be obtained. Therefore, when the exchange apparatus is attached to the distal end of the robot arm or the like, the range of motion can be wide, and the load is small, and as a result dynamic characteristics and the durability can be improved. Further, the exchange base of the operation tool automatic exchange apparatus can be of a small size, and a support table or the like on which the exchange bases are placed can be made small in size. Thus there can be achieved an advantage that the overall construction of the apparatus can be simple. This also can improve the economy.

Further, the automatic exchange operation enables the exchange of the tools without the use of any special operation sequence. Therefore, existing robots and controllers can be utilized.

Figure 9A:
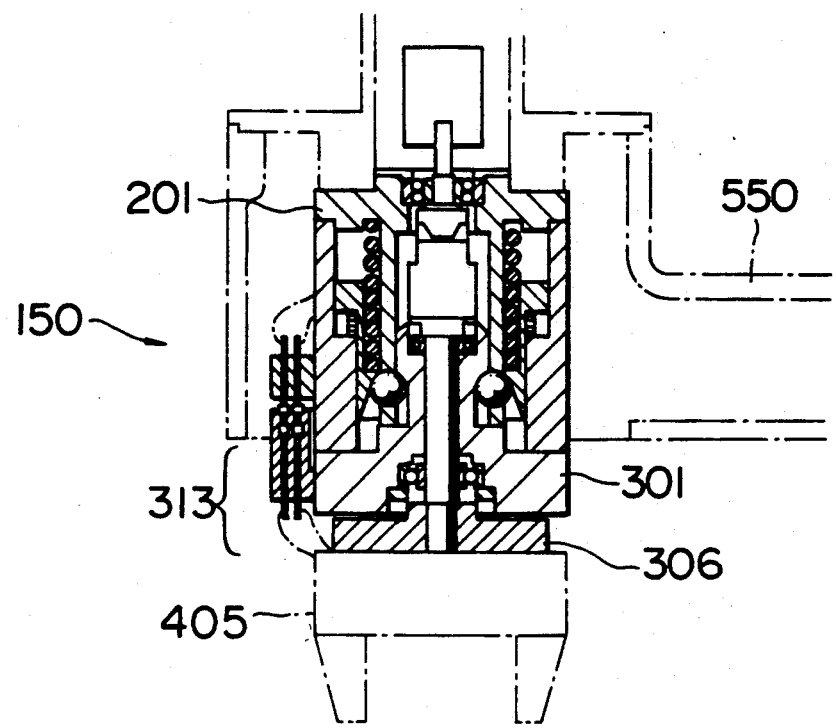
FIGS. 9A and 9B are views showing examples of use of the operation tool automatic exchange apparatus of the invention.
Figure 9B:
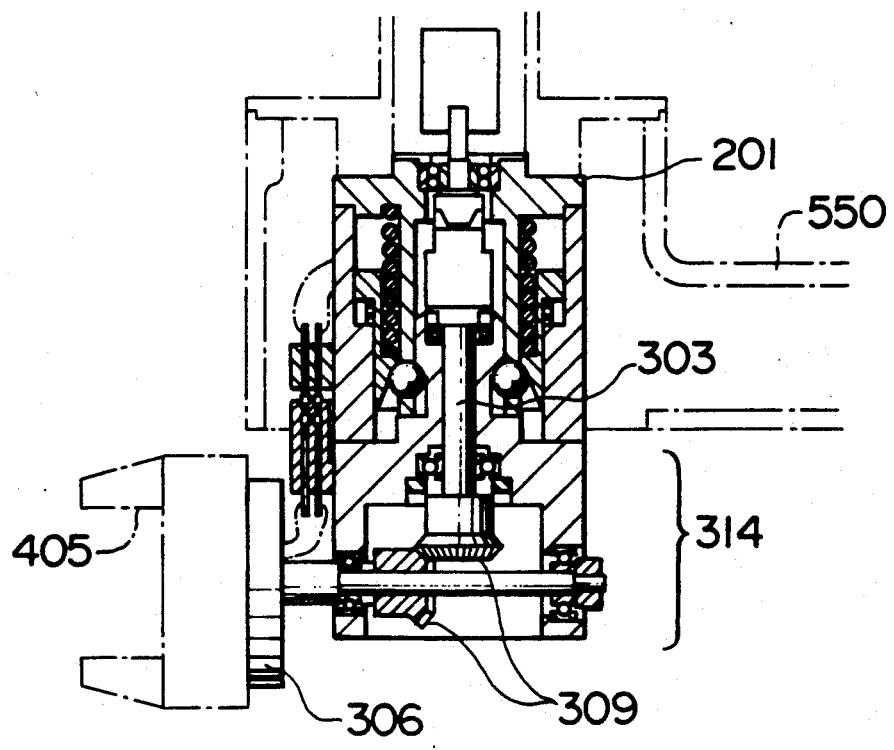

Further, as shown in FIGS. 9A and 9B, by disposing the rotation base 306 in any suitable direction relative to the Oldham's coupling shaft 303, for example, in parallel or perpendicular relation thereto, the combination of the freedom degrees can be arbitrarily changed depending on the kind of the operation, and therefore the operation space can be selected and increased.

In the above embodiment, although the rotation shaft is used for rotating the rotation base 306 so as to change the orientation of the end effector 10, it is possible to use this rotation shaft as a power source for the hand.

Figure 6:
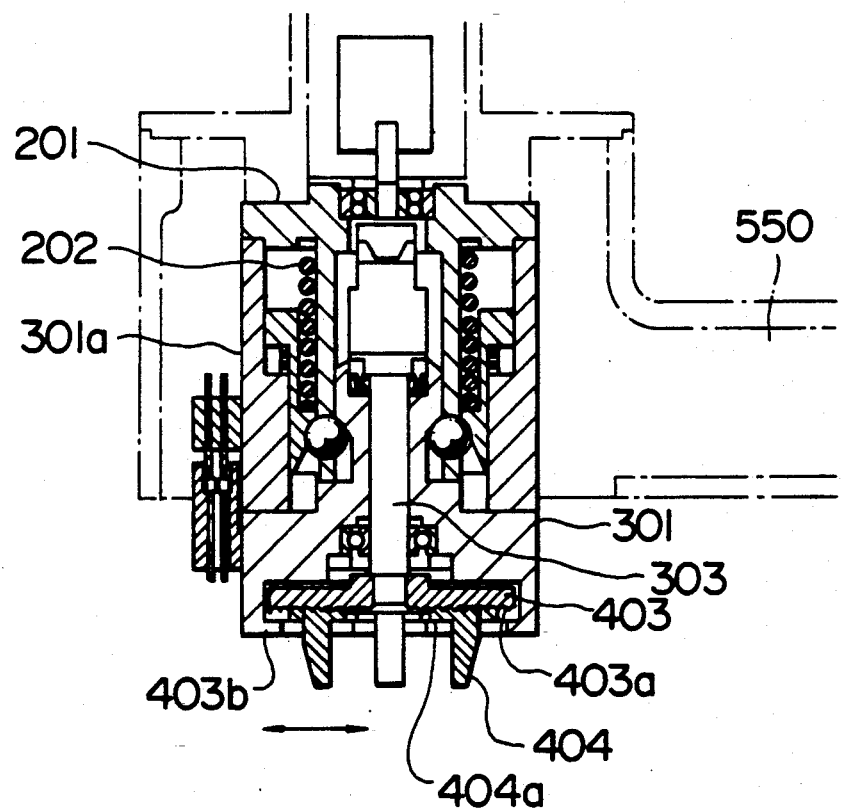
FIG. 6 is a cross-sectional view of a second embodiment of an operation tool automatic exchange apparatus of the invention.

FIG. 6 is a cross-sectional view of a second embodiment of an operation tool automatic exchange apparatus of the invention, showing claws 404 as being moved in directions indicated in this Figure. A rotation table 403 has a planar screw portion 403a, and the claws 404 have a planar screw portion 404a meshed with the planar screw portion 403a. The claws 404 are prevented by a claw holder 403b, having a groove, from being disengaged from the rotation table 403. With this arrangement, when the rotation table 403 is rotated by the servo motor 502, the planar screw portion 403a is rotated to open and close the claws 404, so that the claws 404 can grasp an object.

There can be easily provided a modified construction in which any tool other than a chuck, such as a drill and a screw driver, can be attached to the exchange base 301.

Further, when a reduction gear unit of the servo motor is provided on the hand, the influence of backlash and play in the releaseable-coupling portion of the rotation shaft (which is the Oldham's coupling 304 in this embodiment) is decreased through the agency of the reduction gear unit, thereby improving the rotation precision and the precision of the detection of the rotation angle.

Figure 7:
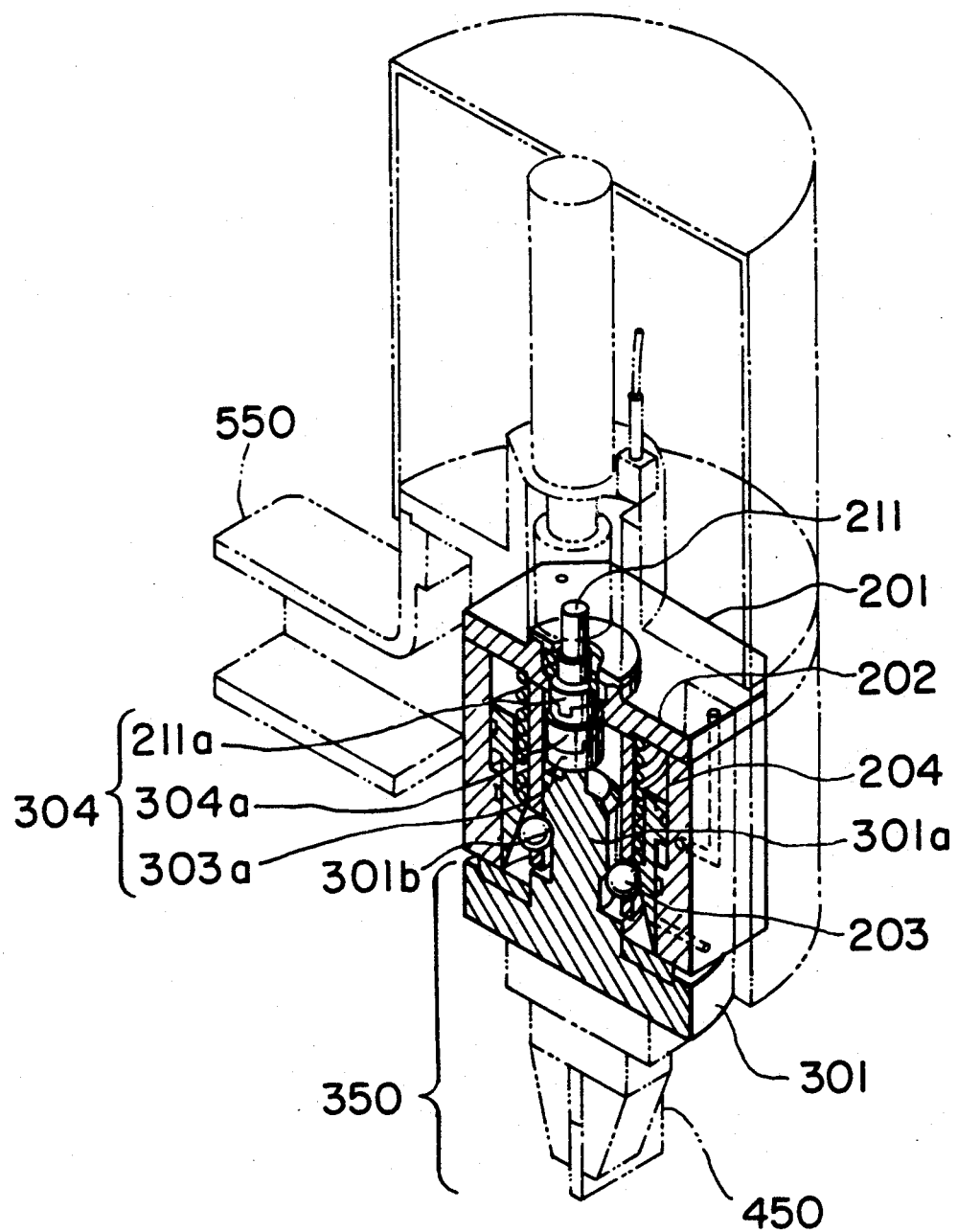
FIGS. 7 and 8 are cross-sectional, perspective views of third and fourth embodiments of operation tool automatic exchange apparatuses of the invention, respectively.

A third embodiment of an operation tool automatic exchange apparatus of the present invention will now be described. FIG. 7 is a cross-sectional, perspective view of the third embodiment of an operation tool automatic exchange apparatus of the invention.

A housing 201 constituting a hold-side member is generally similar to that of the first embodiment. The housing 201 has a contact surface for enabling an exchange base 301, fitted in the housing 201, to be rotated. The exchange base 301, which is a constituent part of an exchange member 350, has a fitting part 301a which is adapted to be fitted in a ball bearing housing 202. The fitting part 301a has a tapered portion 301b for receiving steel balls 203 when the fitting part 301a is fitted in the ball bearing housing 202. The fitting part 301a of the exchange base 301 is fitted in the ball bearing housing 202, and the taper piston 204 is urged downward to urge the steel balls 203 inward, so that the steel balls 203 are engaged with the taper portion 301b of the fitting part 301a, thereby fixedly coupling the exchange base 301 and the housing 201.

An Oldham's coupling 304 is mounted at the upper end portion of the exchange base 301. In the Oldham's coupling 304, an Oldham's coupling hub 211a, which is formed on a lower end of a housing shaft 211, can be releaseably engaged via an Oldham's coupling disk 304a with an Oldham's coupling hub 303a connected to the upper end portion of the exchange base 301. The Oldham's coupling hub 211a has trapezoidal teeth 211c which are engageable in trapezoidal grooves 304b formed in the Oldham's coupling disk 304a. With this construction, a rotation can be transmitted between the housing shaft 211 and the exchange base 301. An end effector 10 is attached to the exchange base 301. In this construction, the exchange base 301 is utilized as a rotation base, therefore the overall construction of the apparatus can be smaller in size and more light-weight, as compared with the apparatus of the first embodiment.

Figure 8:
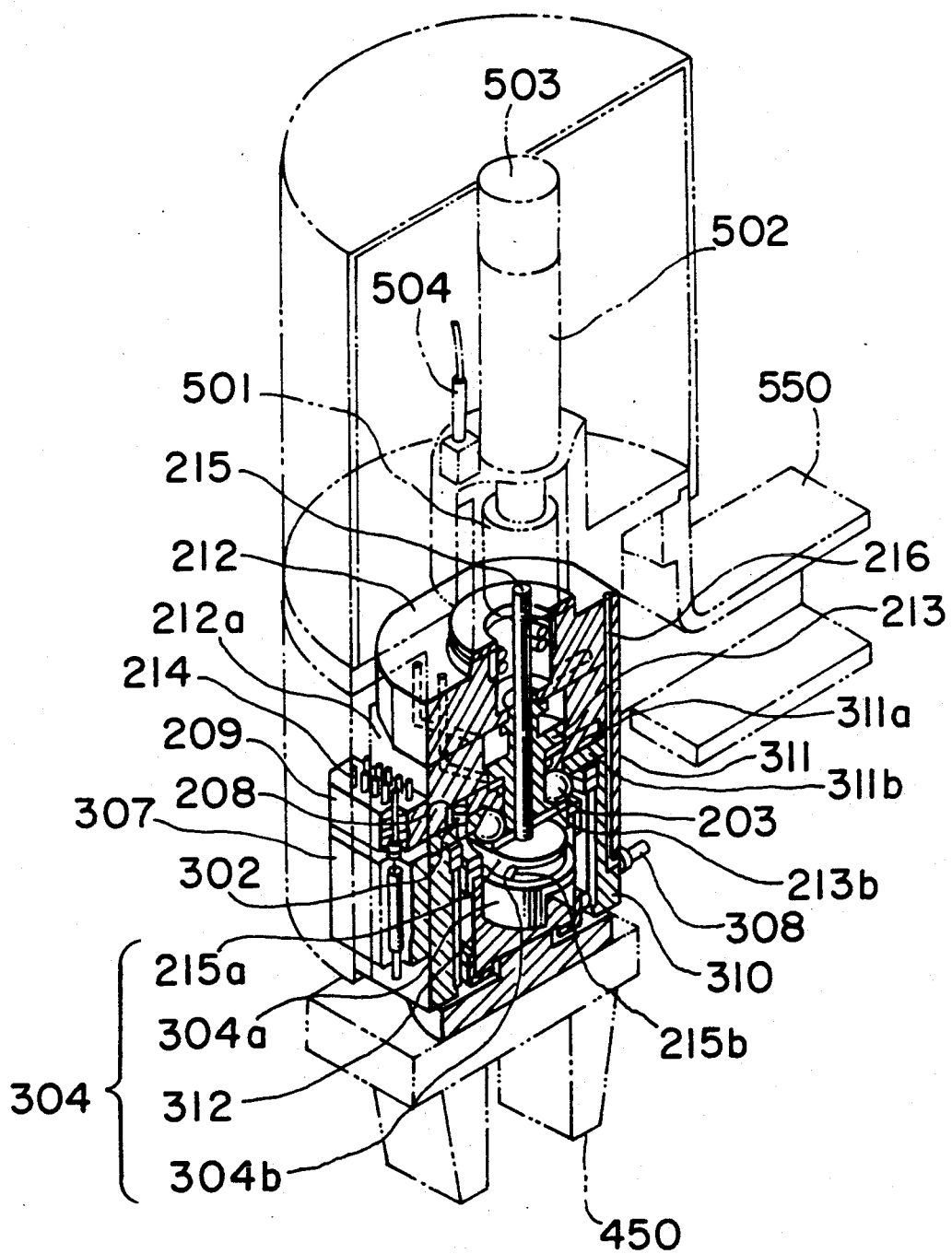

A fourth embodiment different from the above will now be described with reference to FIG. 8. A plate 212 which constitutes part of a hold-side member 250 is attached to a distal end of a robot arm 550, and is moved in a three-dimensional manner in an operation space so as to be positioned. A lock cylinder 212a and a ball bearing holder 214 are fastened to the plate 212. The ball bearing holder 214 incorporates a plurality of steel balls 203. When a lock piston 213 in the plate 212 is operated by pressurized air to be moved downward, a tapered portion 213a of the lock piston 213 urges the steel balls 203 outward relative to the ball bearing holder 214. The steel balls 203 are urged inward by leaf springs (not shown) so that the steel balls 203 may not be disengaged from the ball bearing holder 214. A taper plate 311 is fastened to an upper end portion of an exchange block 310 which constitutes an exchange member 350. A fitting part of the ball bearing holder 214 is fitted on a fitting part 311a of the taper plate 311, and the lock piston 213 is moved downward to urge the steel balls 203 outward, so that the steel balls 203 are urged against a tapered portion 311b of the taper plate 311, thereby coupling the exchange block 310 and the plate 212 together. A rotation prevention pin 302 is engaged in a rotation prevention hole 208 when the plate 212 and the exchange block 310 are coupled together. Thus, the pin 302 and the hole 208 serve as positioning mean for disposing the exchange block 310 and the plate 212 in the same direction each time they are coupled together.

A plate shaft 215 extends through the plate 212 and the lock cylinder 213. An Oldham's coupling rotor 312 constituting an Oldham's coupling 304 is mounted in the exchange block 310 through ball bearings. The Oldham's coupling 304 is releaseably engageable, via an Oldham's coupling disk 304a, with an Oldham's coupling hub 215a formed on the lower end of the plate shaft 215. The Oldham's coupling hub 215a has trapezoidal teeth 215b which are engaged in trapezoidal grooves 304b formed in the Oldham's coupling disk 304a. With this construction, a rotation is transmitted between the plate shaft 215 and the Oldham's coupling rotor 312. With the use of the Oldham's coupling 304, the rotation angle can be transmitted accurately. Because of the use of the Oldham's coupling 304 with the trapezoidal teeth, a small variation in the butting distance between the Oldham's coupling rotor 312 and the plate shaft 215 and a slight misalignment therebetween, which result from dimensional inaccuracies of the exchange block 310 and the plate 212, can be suitably absorbed. Mounted on the lower end of the Oldham's coupling rotor 312 is a rotation base 306 to which a hand and a tool are adapted to be attached. The hand (end effector) 450 is attached to the rotation base 306.

The plate shaft 215 is connected via a coupling 501 to a servo motor 502 mounted on the robot arm 550. An encoder 503 for detecting the rotation angle of the servo motor 502 is integrally mounted on the servo motor 502. A sensor 504 for detecting the origin of the rotational position of the servo motor 502 is mounted on the robot arm 550.

A female contact connector 209 is mounted on the plate 212, and is engageable with a male contact connector 307 mounted on the exchange block 310, thereby making electrical connection between the plate 212 and the exchange block 310. An air passageway 216 is formed through part of the plate 212, and is communicatable with an air passageway 308 formed in the exchange base 301, thereby providing a pneumatic connection between the plate 212 and the exchange block 310 together.

A fifth embodiment of an operation tool automatic exchange apparatus of the present invention will now be described with reference to FIGS. 9A and 9B. The drawings show the operation tool automatic exchange apparatus 150 attached to a distal end of a robot arm 550. As in the first embodiment, an exchange base 313 has a rotation base 306 rotatable about a vertical axis, and a hand 405 is attached to the rotation base 306. Therefore, the exchange base 313 is suited for the kind of operation in which after a part or object is grasped by the hand, a deviation of the orientation about the vertical axis is corrected, and then the mounting operation is carried out. On the other hand, an exchange base 314 has a pair of bevel gears 309 by which the rotation of an Oldham's coupling shaft 303 is converted into a rotation about a horizontal axis. A hand 405 is mounted on a rotation base 306 rotatable about a horizontal axis, and therefore the exchange base 314 is suited for the kind of operation in which a part or object is inverted, or the part is mounted after a deviation of the rotation is corrected in the horizontal direction. By suitably exchanging such end effector 10 depending on the kind of operation, an operation space can be arbitrarily selected and increased.

In the case where at a first stage of the operation, two robot arms are operated independently of each other for carrying out a mounting operation or the like, two exchange bases 313 are attached respectively to the two robot arms. And, when it is desired to operate the two robot arms in a cooperative manner at a second stage of the operation, the exchange base 314 is attached to one of the robot arms, thereby obtaining a combination of necessary freedom degrees. In this case, since extra freedom degree is not provided, there can be used the type of robot arms which have fewer freedom degrees, bit can carry a large weight, and are inexpensive. Therefore, the overall cost of the apparatus can be reduced. Further, since there are not provided extra freedom degrees improved safety can be obtained even in the event of a run-away or a malfunction, thereby minimizing damage to the equipment.

The operation tool automatic exchange apparatuses of the present invention have been described in detail with respect to the above five embodiments. The present invention can be applied to any other type of operation tool automatic exchange apparatus so long as the rotation shaft has power transmission means.

In the above embodiments, although the power transmission mechanism for the rotation shaft is constituted by the Oldham's coupling, the Oldham's coupling may be replaced by a combination of a clutch (e.g. a claw clutch or a friction clutch) and a flexible joint (e.g. tire coupling). Also, instead of coupling and disconnecting the rotation shaft in the axis direction, there can be used friction wheels which are provided respectively on the hold-side member and the exchange member 350 and are adapted to be brought into and out of pressure contact with each other, or there can be used gears which are provided respectively on the hold-side member and the exchange member and are adapted to be meshingly enaged with each other.

Further, instead of transmitting the rotational motion, there can be used a linearly-movable rod which is coupled by a coupling claw, thereby transmitting a linear motion.

In the above embodiments, although the servo motor is used as the actuator, the servo motor may be replaced by any other suitable actuator such as a stepping motor and a pneumatic motor.

In the above embodiments, although the servo motor is mounted on the hold-side member, the servo motor may be mounted on the exchange member 350, in which case only the detection means for detecting the rotation angle is mounted on the robot arm. In this case, the servo motor best suited for the operation can be selected, and since the encoder having many signal wires is disposed on the hold-side member, the connection and disconnection of the wiring can be made less cumbersome, and the number of points of connection of the signal wires is reduced, thereby improving the reliability.

As described above, in the operation tool automatic exchange apparatuses of the present invention, the drive force transmission means and the releaseable coupling means (for example, the rotation shaft and the releaseable joint or the electric cable and the connector) are provided between the exchange member (end effector) and the hold-side member for releaseably holding the exchange member. Therefore, there is no need to mount the actuator on the end effector. For this reason, the end effector (e.g. exchange member for grasping the operation tool) can be of a small-size and be lightweight, and also the exchange end effectors can be of an inexpensive construction.

Further, the space for accommodating the end effectors can be small.

Further, advantageously, degrees of freedom can be arbitrarily added depending on the kind of operation, and also the operation space can be arbitrarily increased. Therefore, since the apparatus only requires necessary degrees of freedom, the overall size of the apparatus can be reduced, and the economy can also be improved.

When the apparatus of the present invention having the tool-holding rotation base mounted on the exchange base is to be used, the operation tool can be efficiently used by suitably selecting the orientation of the rotation base (i.e., the direction of the axis of rotation) in connection with the operation tool.

In the operation tool automatic exchange apparatuses of the present invention, one-degree-of-freedom control can be applied to the end effector without separately adding an actuator. Therefore, by attaching the operation tool automatic exchange apparatus of the invention to the distal end of the arm of the above-mentioned six-degree-of-freedom robot mechanism, the following synergistic effects can be achieved. Namely, since the robot mechanism has seven degrees of freedom, there is redundancy with respect to one degree of freedom, and if there is a singular point in the motion of the robot arm, this singular point can be quite easily avoided because of this redundancy. Also, advantageously, if there is an obstacle, this can be easily avoided.

Next, preferred embodiments of gravity balancing apparatuses of the present invention will now be described with reference to the drawings.

FIGS. 10–14 contain schematic representations of the link 4, or swing arm, having alternate gravity balancing devices.

Figure 10A:
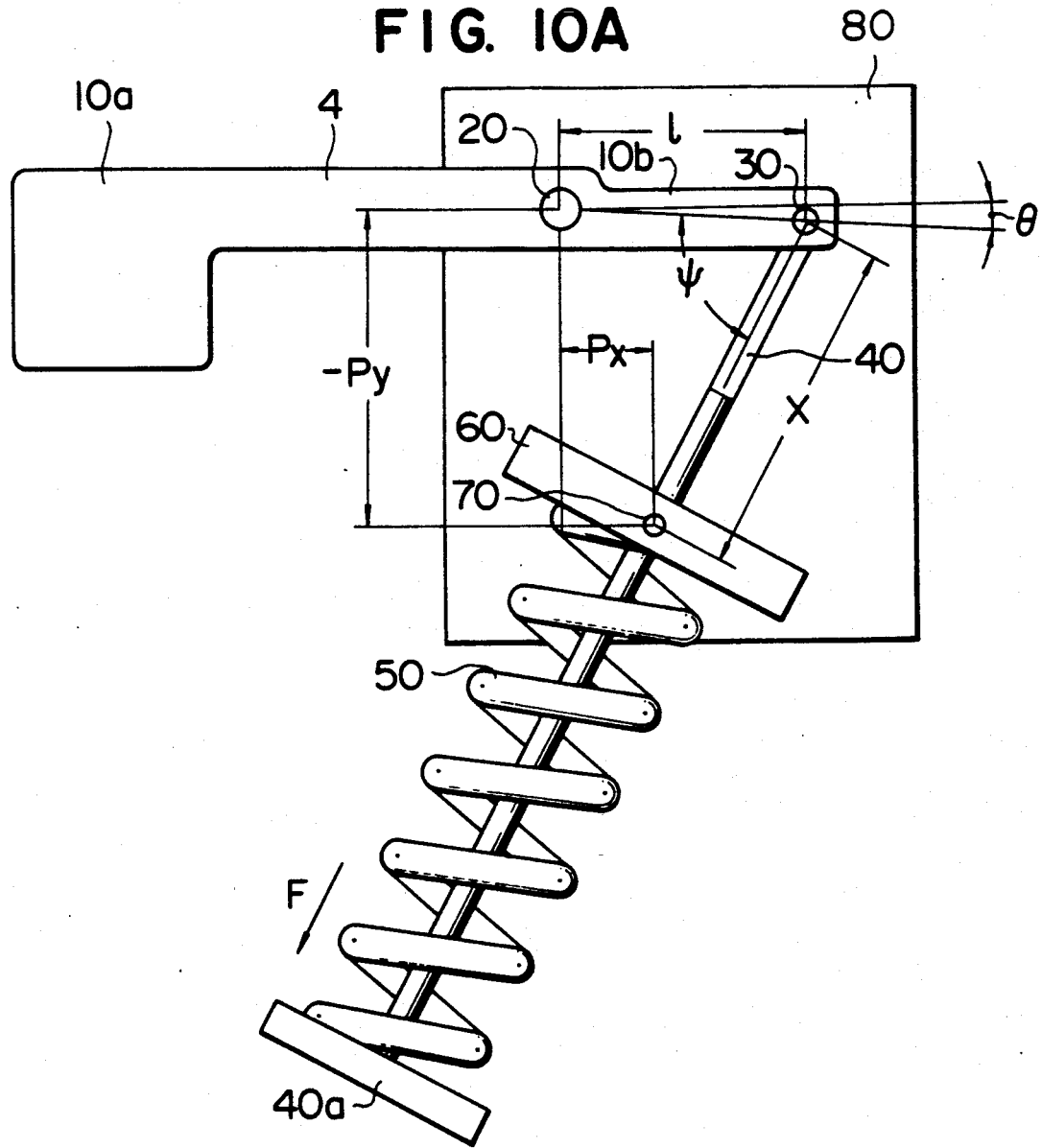
FIG. 10A is a side-elevational view of a first embodiment of a gravity balancing apparatus of the present invention.
Figure 10B:
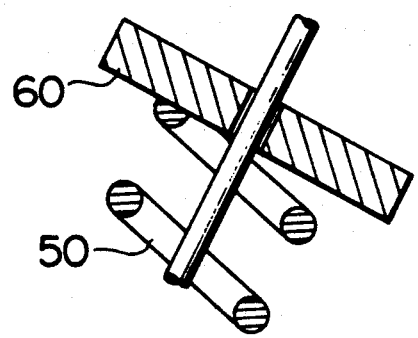
FIG. 10B is a fragmentary view of the gravity balancing apparatus of FIG. 10A.

FIG. 10 shows one embodiment of a gravity balancing apparatus of the present invention. A swing arm 4 swings about a swing shaft 20, and a load 10a is mounted on the distal end of the swing arm 4. A balance arm 10b is integrally formed at a side of the swing arm 4 opposite to the load 10a. A rotatable pin 30 is provided at the balance arm 10b, and is spaced a distance l from the swing shaft 20. A rod 40 is attached to the pin 30, and when the swing arm 4 swings, the rod 40 is pulled. A lower spring retainer 40a is provided on the lower end of the rod 40, and the rod 40 is movable together with a compression spring 50. The upper end of the compression spring 50 is supported by an upper spring retainer 60, and the upper spring retainer 60 is mounted on a rotation shaft 70 so as to rotate about the rotation shaft 70. The rotation shaft 70 as well as the swing shaft 20 is mounted on a structural member 80. With this construction, when the swing arm 4 swings, the compression spring 50 expands or contracts, so that the compression spring 50 can bear the gravitational torque due to the load 10a of the swing arm 4. Here, F represents the force of the compression spring 50 acting in the axial direction of the rod 40 so as to balance the swing arm 4, $\theta$ represent the swing angle of the swing shaft 20 ($\theta=0$ in the position where the maximum gravitational load acts on the swing shaft 20), $\phi$ represents the angle between a line passing through the swing shaft 20 and the pin 30 and a line passing through the pin 30 and the rotation shaft 70, $l$ represents the distance between the swing shaft 20 and the pin 30, x represents the distance between the pin 30 and the rotation shaft 70, px-py represent the position of the rotation shaft 70 relative to the swing shaft 20, and k represents the spring constant of the compression spring 50. Then, the torque T for balancing the swing arm 1 is expressed by the following formula:

$$T = l \cdot F \cdot \sin\psi \qquad (1)$$

Here, $\tan\alpha = px/py$ $$r = \sqrt{(px^2 + py^2)}$$

From the cosine theorem, the following is obtained:

$$x^2 = r^2 + l^2 + 2 \cdot l \cdot r \cdot \cos(\pi/2 - \alpha - \theta) \qquad (2)$$

This can be expressed as follows:

$$x^2 = px^2 + py^2 + l^2 + 2 \cdot l \cdot r \cdot \sin(\alpha + \theta) \qquad (3)$$

The force F of the compression spring 50 is proportional to x, and therefore the following is obtained:

$$F = k(x + xo) \qquad (4)$$

where xo is a constant determined by the setting of the spring.

From the sine theorem, the following is obtained:

$$\frac{\sin\psi}{r} = \frac{\sin(\pi/2 - \alpha - \theta)}{x} = \frac{\cos(\alpha + \theta)}{y} \qquad (5)$$

$$\therefore \sin\psi = \frac{r \cdot \cos(\alpha + \theta)}{x}$$

From the formulas (1), (4) and (5), the following is obtained:

$$T = l \cdot F \cdot \sin\psi = \left(1 + \frac{xo}{x}\right) \cdot l \cdot r \cdot \cos(\alpha + \theta) \qquad (6)$$

Here, $x = \sqrt{(l^2 + r^2 + 2lr\sin(\alpha + \theta))} \qquad (7)$

The gravitational torque $T_{load}$ about the swing shaft 20 which torque is produced by the gravitational load of the swing arm 4 is expressed by the following formula:

$$T_{load} = W \cdot \cos\theta \cdot L \qquad (8)$$

where W represents the gravity of the load 10a, and L represents the length of the swing arm extending to the load.

Since $T_{load}$ is balanced by T, the torque $T_{all}$ produced by the gravity about the swing shaft 20 is expressed by the following formula:

$$T_{all} = T_{load} - T \qquad (9)$$

The formula (9) is a function of l, k, px, py and xo, and therefore by suitably selecting it so as to render $T_{all}$ generally zero, the balancing can be achieved.

Parameters of the gravity balancing apparatus of this embodiment are shown in Table 1 by way of example.

TABLE 1

| | |
|---|---|
| Spring constant | k = 1172 N/m |
| Load on arm distal end | WL = 27 Nm |
| Length of balance arm | l = 70 mm |
| Position of swing shaft of balancing apparatus | px = 32 mm |
| | py = 110 mm |

The proviso is added that in the horizontal position of the swing arm (in which condition the maximum gravitational torque is present), the balance arm 10b is disposed horizontally.

Figure 11:
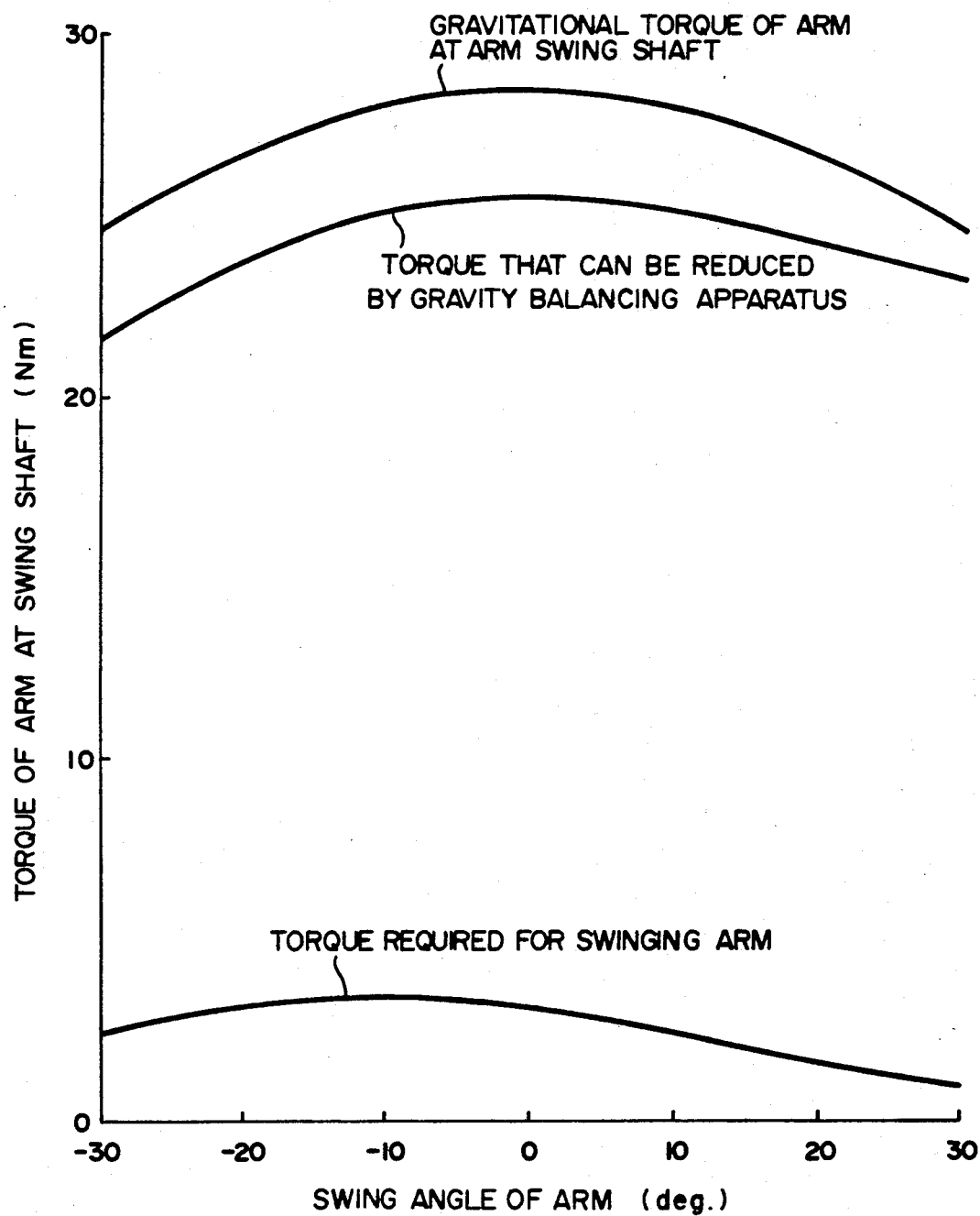
FIG. 11 is a diagram showing a swing angle of a swing arm, a gravitational load of the swing arm, and a balancing amount of the gravitational load in the gravity balancing apparatus of the invention.

The results of the gravity balancing obtained with the use of the parameters of Table 1 are shown in FIG. 11. It will be appreciated that the load torque $T_{all}$ is reduced to less than 1/10. In this case, although the load torque $T_{all}$ can be further reduced, the parameters or dimensions are determined in connection with the neighboring structural members.

As described above, by suitably determining the various constants, the torque of the swing arm 4 about the swing shaft 20 can be rendered generally zero within the range of swinging movement of the swing arm 4.

Since the compression spring is used, there is no hook portion on which a stress concentrates, and the spring can be designed into a minimum size far withstanding the load. Without the use of such a hook portion, the overall length of the spring can be reduced, so that the overall size of the apparatus can be compact.

Figure 12:
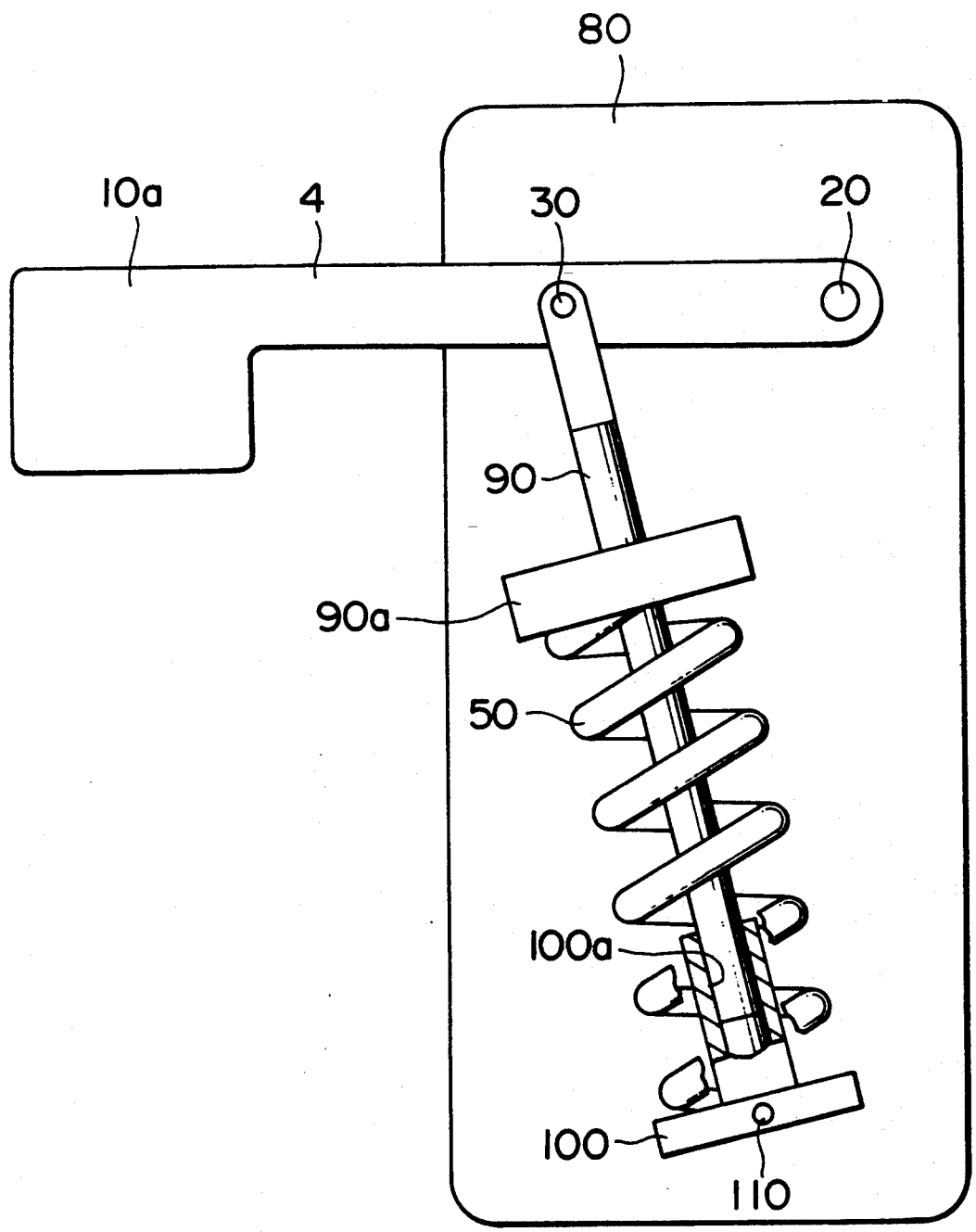
FIG. 12 is a side-elevational view of a second embodiment of a gravity balancing apparatus of the invention.

FIG. 12 shows a second embodiment of a gravity balancing apparatus of the present invention.

A swing arm 4 swings about a swing shaft 20, and a load 10a is mounted on the distal end of the swing arm 4. A rotatable pin 30 is provided at a portion of the swing arm 4 intermediate the load 10a and the swing shaft 20, and is spaced a distance l from the swing shaft 20. A rod 90 is attached to the pin 30, and when the swing arm 4 swings, the rod 90 is pushed down. An upper spring retainer 90a is mounted on the rod 90 intermediate the opposite ends thereof, and receives a compression spring 50. The lower end of the compression spring 50 is supported by a lower spring retainer 100, and the lower spring retainer 100 is supported by a rotation shaft 110, and is rotatable about the rotation shaft 110. The rod 90 is inserted in a hole 100a formed in the lower spring retainer 100, and when the swing arm 4 moves, the rod 90 is moved into and out of the hole 100a in the lower spring retainer 100. The rotation shaft 110 as well as the swing shaft 20 is mounted on a structural member 80. With this construction, as in the preceding embodiment, when the swing arm 4 swings, the compression spring 50 is expanded or contracted, so that the compression spring 50 can bear the gravitational torque due to the load 10a of the swing arm 4. In this case, also, the positional relation which cancels the gravitational torque can be obtained, using formulas similar to the above-mentioned formulas.

As described above, since the balance torque can be calculated by the formula (9), the optimum parameters or dimensions can be easily obtained depending on the kind of apparatus to be used.

Figure 13:
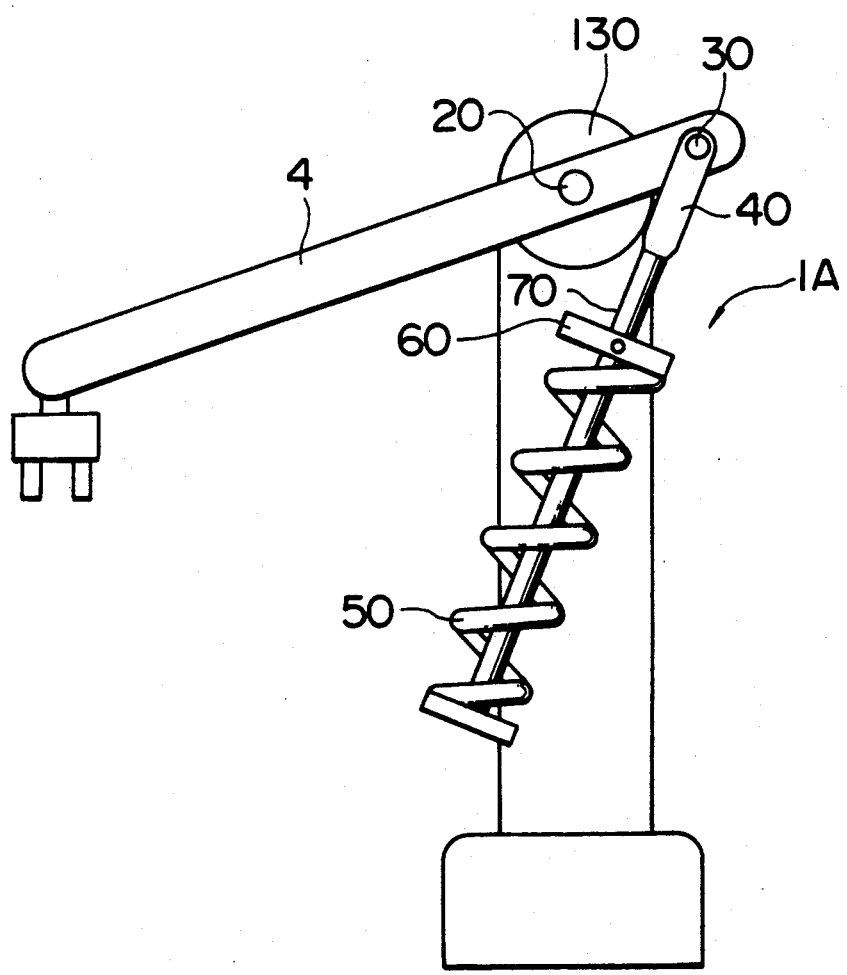
FIG. 13 is a side-elevational view of a robot provided with a gravity balancing apparatus of the invention.

FIG. 13 schematically shows a robot 1A in which the above gravity balancing apparatus is used in an arm mechanism. In the case where the gravity balancing apparatus of the present invention is used in an arm 4 of the robot 1A, the influence of gravity on an actuator 130 for moving the arm 4 is hardly present, and therefore the output of the actuator 130 can be made small, and the robot 1A can be of a lightweight design. Further, since the output of the actuator 130 is not used for balancing the gravitational load, there can be achieved an advantage that an acceleration performance is improved, thereby improving the performance of the robot.

In the case where a pneumatic spring is used as the compression spring 50, the range of selection of the spring constant k is wide, which makes it easy to design the gravity balancing apparatus having a required performance.

Figure 14:
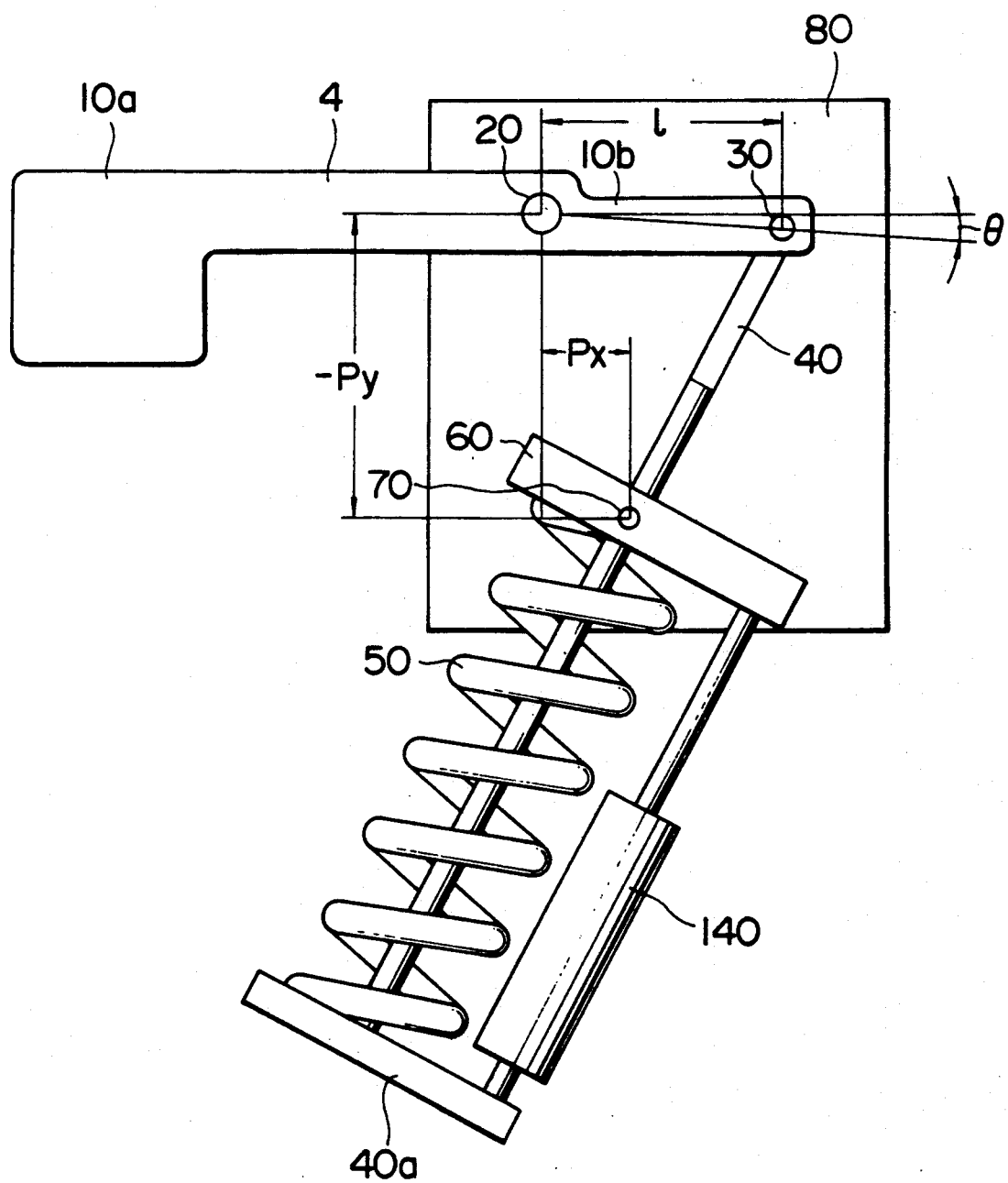
FIG. 14 is a side-elevational view of a third embodiment of a gravity balancing apparatus of the invention.

FIG. 14 shows an embodiment of the invention in which there is provided a damper for acting against the swinging motion of the swing arm. In this embodiment, the damper 140 is provided in parallel relation to the compression spring 50. More specifically, the damper 140 is mounted between the upper and lower spring retainers 60 and 40a of the gravity balancing apparatus of FIG. 10. In this construction, the damper 140 damps the movement of the swing arm 4 when achieving the gravity balancing, and therefore there can be eliminated the possibility that the swing arm 4 abruptly moves with a small amount of torque, and also the vibration of the swing arm 4 can be suppressed. The damper has only to act against the swing movement of the swing arm 4 about the swing shaft 20, and therefore, for example, a rotary damper may be mounted on the swing shaft.

The present invention is not limited to the above embodiments of gravity balancing apparatuses, and various modifications can be made without departing from the spirit of the present invention.

As described above, in the gravity balancing apparatuses of the present invention, the gravitational load of the arm swingable up and down can be balanced to zero or generally zero, and therefore the torque for swinging the arm mechanism can be reduced.

Since the balance torque can be easily calculated by the numerical formulas, the optimum parameters or dimensions can be easily obtained depending on the kind of apparatus to be used.

Further, in contrast with a method of using a balancing weight, the inertia moment about the swing shaft is not increased, and therefore the swinging response of the arm can be improved. Also, when this balancing apparatus is used in the arm of the robot, the influence of the gravity on the actuator for moving the arm is reduced, and therefore the output of the actuator can be reduced, so that the robot can be of a light weight construction. Further, since the output of the actuator is not used for balancing the gravitational load, the acceleration performance is improved, thereby improving the performance of the robot When a pneumatic spring is used as the compression spring, the range of selection of the spring constant k and the initially-set force kxo is wide, which makes it easy to design the gravity balancing having the required performance.

Further, when there is provided the damper for acting against the swing movement of the swing arm 4, there can be eliminated the possibility that the swing arm abruptly moves with a small amount of torque, and also the vibration of the swing arm 4 can be suppressed.

What is claimed is:

1. A robot system comprising:
a three-degree-of-freedom translation movement unit and a three-degree-of-freedom rotation movement unit;
said three-degree-of-freedom translation movement unit including:
a first base member;
a first motor having a vertical output shaft;
a turning post mounted on said first base member for rotation about a vertical axis and directly connected to the vertical output shaft of the first motor;
a third motor having a vertical output shaft;
an arm member directly connected to the vertical output shaft of the third motor so that said arm member is pivotally moved about said vertical output shaft of said third motor;
a fourth motor having an output shaft;
a wrist member connected to a distal end of said arm member and having an end effector rotatable about a vertical axis by being connected to the output shaft of the fourth motor;
link means for operably connecting said turning post to said arm member, including a second motor mounted on an upper end portion of said turning post and having a horizontal output shaft, a first link directly connected to the horizontal output shaft of the second motor so that said first link is pivotally moved about said horizontal output shaft of said second motor, a second link pivotally mounted on said turning post about a horizontal axis in parallel with said first link, and an up-down member pivotally connected to distal ends of said first link and said second link, said arm member being mounted to said up-down member; and
gravity balancing means for applying a force to said first link to balance a gravitational load applied to said link means;
said three-degree-of-freedom rotation movement unit including:
a second base member;
a fifth motor having a vertical output shaft;
a first rotation part mounted on said second base member for rotation about a vertical axis and directly connected to the vertical output shaft of the fifth motor;
a sixth motor mounted on said first rotation part and having a horizontal output shaft;
a second rotation part directly connected to the horizontal output shaft of the sixth motor so that said second rotation part is rotated about said horizontal output shaft of said sixth motor;
a seventh motor mounted on said second rotation part and having a horizontal output shaft; and
a table for supporting a workpiece, said table being directly connected to the horizontal output shaft of the seventh motor so that said table is rotated about said horizontal output shaft of said seventh motor, said horizontal output shafts of said sixth and seventh motors being substantially perpendicular with each other and having horizontal axes of rotation which intersect with said vertical axis of said first rotation part at a single point, so that operations are effected by said wrist member of the three-degree-of-freedom translation movement unit to a workpiece located on said table of the three-degree-of-freedom rotation movement unit.

2. A robot system according to claim 1, wherein said three-degree-of-freedom rotation movement unit further comprises:
a first electromagnetic brake, for locking said second rotation part, mounted on said first rotation part oppositely to said sixth motor so as to balance a gravitational load applied to said sixth motor, and
a second electromagnetic brake, for locking said table, mounted on said second rotation part oppositely to said seventh motor so as to balance a gravitational load applied to said seventh motor.

3. A robot system according to claim 1, wherein said three-degree-of-freedom translation movement unit further comprises an electromagnetic brake, for locking said first link, mounted on said turning post.

4. A robot system according to claim wherein said gravity balancing means of said three-degree-of-freedom translation movement unit comprises a compression spring mounted between said first link and said turning post.

5. A robot system according to claim wherein said gravity balancing means of said three-degree-of-freedom translation movement unit comprises a compression spring and a damper mounted between said first link and said turning post.

6. A robot system according to claim wherein said wrist member of said three-degree-of-freedom translation movement unit includes an operation tool exchange apparatus for releasably engaging an operation tool.

7. A robot system according to claim wherein said wrist member of said three-degree-of-freedom translation movement unit includes detection means for detecting a rotation angle of said fourth motor.

8. A robot system according to claim 7, wherein said wrist member of said three-degree-of-freedom translation movement unit includes an operation tool exchange apparatus for releasably engaging an operation tool.

* * * * *